United States Patent [19]
Husbands et al.

[11] Patent Number: 5,446,572
[45] Date of Patent: Aug. 29, 1995

[54] OPTICAL INTERCONNECTS FOR HIGH SPEED BACKPLANES USING SPECTRAL SLICING

[75] Inventors: Charles R. Husbands, Acton, Mass.; Mary Girard, East Hampstead, N.H.

[73] Assignee: The Mitre Corporation, Bedford, Mass.

[21] Appl. No.: 836,986

[22] Filed: Feb. 14, 1992

[51] Int. Cl.$^6$ .................................................. H04J 14/02
[52] U.S. Cl. .................................. 359/133; 359/124; 359/127; 359/130
[58] Field of Search .................. 395/275, 200, 325; 359/124, 115, 123, 125, 127, 130, 133

[56] References Cited

U.S. PATENT DOCUMENTS

| | | | |
|---|---|---|---|
| 4,797,879 | 1/1989 | Habbab | 359/123 |
| 4,873,681 | 10/1989 | Arthurs | 359/123 |
| 4,989,199 | 1/1991 | Rzeszewski | 359/123 |
| 5,101,290 | 3/1992 | Eng | 359/123 |
| 5,194,977 | 3/1993 | Nishio | 359/123 |

OTHER PUBLICATIONS

Rund, R. et al., "Experimental Demonstration of Bidirectional WDM Transmission with LED Spectral Slicing", Eighth Annual European Fibre Optic Communications and Local Area Networks Conference (E-FOC 90), Munich, pp. 365–368, Jun. 1990.

Hunwicks, A. et al., "An Optical Transmission System for Single-mode Local Loop Applications Using a Sliced Spectrum Technique" Twelfth International Fiber Optic Communications and Local Area Networks Exposition (FOC/LAN'88), pp. 237–240, Sep. 1988.

Wagner, S. et al., "Technology and System Issues for a WDM-Based Fiber Loop Architecture", Journal of Lightwave Technology, vol. 7, No. 11, pp. 1759–1768, Nov. 1989.

Dono, N. et al., "A Wavelength Division Multiple Access Network for Computer Communication", IEEE Journal on Selected Areas in Communications, vol. 8, No. 6, pp. 983–994, Aug. 1990.

Goodman, M. et al., "The LAMBDANET Multiwavelength Network: Architecture, Applications, and Demonstrations", IEEE Journal on Selected Areas in Communications, vol. 8, No. 6, pp. 995–1004, Aug. 1990.

Arthurs, E. et al., "Multiwavelength Optical Crossconnect for Parallel-Processing Computers", Electron. Lett., vol. 24, pp. 119–120, 1988.

Arthurs, E. et al., "HYPASS: An Optoelectronic Hybrid Packet Switching System", IEEE Journal on Selected Areas in Communications, vol. 6, No. 9, pp. 1500–1510, 1988.

Metcalf, B. et al., "High Capacity Wavelength Demultiplexer with Large Diameter GRIN Rod Lens", Appl. Opt. vol. 21, p. 794, Mar. 1982.

Husbands, C. et al., "The Application of Spectral Sliced LED Technology to Optical Interconnects of High Speed Backplanes", Ninth Annual European Fibre Optic Communications and Local Area Networks Conference (EFOC/LAN'91), pp. 386–389, London, Jun. 1991.

Girard, M. et al., "Dynamatically Reconfigurable Optical Interconnect Architecture for Parallel Multi-processor Systems", SPIE 1991 International Symposium on Applied Science and Engineering, vol. 1573, pp. 156–167, San Diego, Calif., Jul. 1991.

Primary Examiner—Leslie Pascal
Attorney, Agent, or Firm—Peter J. Manus

[57] ABSTRACT

An n-channel optical interconnect is suitable for use as a high speed, low latency interconnect at a backplane of a parallel processing computer. The interconnect uses spectral slicing to address the output of the processor to one or more other processors. Each processor has an optical receiver and n optical sources that each produce the same spectrum. The light output of the sources is directed to a wavelength division multiplexer (WDM) that produces an optical output signal in one or more portions of the spectrum. A selected portion is produced by energizing a selected one of the n optical sources. Each portion is associated with a single addressee processor. A passive star coupler combines all of the outputs of all of the WDM's. A wavelength division demultiplexer (WDDM) separates this composite signal back into the spectral portions. Electronic gating logic enables the appropriate source or sources at each transmitting processor. Control logic monitors transmissions from the star coupler to prevent collisions.

11 Claims, 13 Drawing Sheets

OPTICAL INTERCONNECTS FOR HIGH SPEED BACKPLANES USING SPECTRAL SLICING

BACKGROUND OF THE INVENTION

This invention relates in general to interconnects for use in communication networks, particularly in high speed computer backplanes. More specifically, it relates to an optical interconnect operating in a wavelength division multiple access architecture.

In computer technology there has been considerable growth in recent years in parallel processing, that is, multiple processors operating in parallel rather than one processor operating serially. To operate efficiently, the processors and memory must be interconnected in a way that allows a very high speed flow of data among the processors along any path, and with a low latency (latency being measured by M/B where M is the bytes to be routed through the system and B is the bandwidth of the channel in bytes per second).

Time division multiplexing (TDM) and a variety of architectures have been proposed. However, TDM is effective for only a limited number of processors. If the system must be scaled up, the bus connecting the processors is soon saturated. Various time shared buses have been investigated to scale up. FIG. 1A shows a hierarchy bus architecture. FIGS. 1B, 1C and 1D show ring, mesh and hypercube architectures to interconnect processors without the limitations of bus-based architectures. PE in these figures denotes a processor element; I/O denotes an input/output interface. These non-bus systems, however, offer only limited scaling since data routed between non-adjacent processors must pass through several processors. This situation is characterized by large node delays and high system latency. Moreover, all of these architectures exhibit speed and distance constraints due to electromagnetic effects such as inductive reactance to fast rising signals. The result is that electrical signals are transmitted over very short lengths (inches) at high speed data transmission rates (100's of Megabits per second), or speed is compromised for length. However, recent research has indicated that regardless of the architecture or routing, the speed of solution of a problem by multiple processors is ultimately limited by the communication latency, regardless of the number of processors applied to the problem. Attempts to interconnect large arrays of processors has also been hampered by power consumption considerations.

In communications networks, optical connections between processors are well known. TDM systems are most common, but wavelength division multiple access (WDMA) network implementations are also known. The WDMA systems are traditionally based on a passive star architecture as shown generally in FIG. 2. Communications between any two processors in the network is established over a common wavelength channel between two elements. Assuming only one transmitter attempts to communicate simultaneously with any one receiver, "n" processors can establish "n" asynchronous communications links operating simultaneously. This system also has the ability to establish transmit/receive wavelength channels that are unique and non-interfering from channel to channel. Broad spectrum bandwidth LED's (30–150 nm) have used the selective filtering characteristics of WDM devices to provide a number of different slices from identical LED sources. This arrangement multiplexes a number of communicating signals over a single fiber optic transmission line. This arrangement however, has proven to be severely power limited due to the power loss in a given channel due to the spectral slicing process. Dispersion is another source of power loss. These power loss problems have limited this technology to relatively short link lengths or low data rate applications.

To address one or more processors to receive a transmission from a transmitting processor, it is known (i) to fix the transmitters at a selected frequency and tune the receivers over the operating bandwidth, (ii) to fix the frequency of the receivers and to tune the transmitters, or (iii) to tune filters disposed between fixed frequency transmitters and fixed frequency receivers.

Several WDMA networks have been implemented using a fixed source, variable receiver approach. One is AT&T's Lambdanet. It uses a laser source at each processor which operates at a fixed wavelength. Outputs from each processor are combined at a star coupler. A wavelength division demultiplexer (WDDM) at each processor decomposes the combined optical spectrum from the star coupler into each of the applied input wavelengths by spectral filtering. Each output leg of the WDDM is applied to a separate receiver. Therefore at each processor there must be a laser source (operating at a unique wavelength), a WDDM, and "n" optical receivers. This arrangement is very costly since (i) optical receivers are costly and (ii) to support "n" channels there must be $n^2$ receivers. Also, the laser sources are costly.

A second WDMA implementation by IBM called Rainbow I also uses a laser transmit source operating at a wavelength uniquely associated with that source. Connection is established via one photodetector at each processor preceded by a Fabry-Perot filter package. The transmitter continuously transmits a broadcast request specifying a destination receiver. If a receiver is not occupied, it continuously searches for a request by tuning the associated spectral filter. When the designated receiver detects a request for transmission to itself, a link is established. One drawback with this system is the loss of time inherent in the system while the spectral filter sweeps through the bandwidth to make a link. Another is the cost of the tunable filters. Further, both Lambdanet and Rainbow I rely on optical sources that operate at a well-defined wavelength, despite temperature variations and changes in other operation parameters. Lasers with this capability require unusually good quality control during manufacture and are comparatively expensive.

To produce a system that varies the wavelength of the transmitter requires a reliably tunable laser. With conventional lasers it is necessary to change the chemistry from batch to batch to produce a series of devices at varying wavelengths. Laser devices can also be tuned over limited ranges by temperature control, but this approach is costly and has a large power consumption. Recent research on a tunable laser has focused on additional external cavities that can be selected to produce a given wavelength. At present, however, such tunable lasers are not commercially available. Electronically tunable lasers are known and commercially available, but they can be tuned over only a few nanometers range. Also, it is not possible to change the frequency of the sources fast enough for high speed backplane applications or many communication network applications.

Other light sources besides lasers are known, but heretofore the principal alternative light source has been the light-emitting diode (LED). It, however, is not a coherent source. As such, as noted above in the discussion of prior spectral slicing links, it requires more power to compensate for the effects of chromatic dispersion when its light output is transmitted along an optical fiber. In addition, LED's are known as having a comparatively low data transmission rate and as being not tunable to a unique frequency, or tunable within a range of frequencies.

It is therefore a principal object of the present invention to provide an interconnect for the transmission of data that operates at a sufficiently high speed and with a sufficiently low latency to interconnect backplanes of parallel processors.

Another principal object is to provide the foregoing advantages at a low cost using no tunable sources, receivers or filters and not requiring high cost lasers with a well defined wavelength output.

A further object is to provide the foregoing advantages while exhibiting an acceptable power loss and low cross talk between channels.

Yet another object is to provide an interconnect with the foregoing advantages that is not limited by transmission line effects and allows transmissions over multiple channels at throughputs of up to 3.2 Gigabits per second (Gbps).

A further object is to provide an interconnect that is not limited to any given protocol and which can operate in a variety of applications, including the interconnection of the backplanes of a large array of parallel processors and the replacement of a conventional backplane servicing multiple processors connected to a common bus.

A still further object is to provide an interconnect which allows the simultaneous interconnect between multiple processors in either an addressee-specific mode or a broadcast mode.

Yet another object is to provide an interconnect which can be reconfigured.

Another object is to provide an interconnect with the foregoing advantages which is substantially insensitive to temperature variations and electromagnetic interference.

Still another object is to provide an interconnect with the foregoing advantages that can be formed using known, comparatively low cost components.

SUMMARY OF THE INVENTION

An optical interconnect for high speed data transmission among n processors includes n light sources associated with each processor. The light sources can each be formed by one or several LED's that produce an output spectrum that is substantially the same for all of the light sources. The spectrum has sufficient bandwidth that it can be divided into n channels with relatively low cross talk between channels at a desired data transmission rate. A wavelength division multiplexer (WDM) associated with each processor receives the output of all of the n sources associated with that processor. The WDM filters the output of the n sources into n distinct segments each uniquely associated with one source and one addressee processor.

A star coupler combines the spectral output of all of the WDM's into a single output. A wavelength division demultiplexer (WDDM) separates this composite output back into n portions, each having a bandwidth associated with a specific addressee processor. Fiber optic cables direct each spectral portion to a processor uniquely associated with that portion, and more specifically, to an optical receiver associated with that processor.

The optical interconnect includes an electronic gating network that converts an electrical input signal that identifies the addressee or addressees for a given transmission into output signals enabling the light source or light sources associated with that address or addresses. It also includes a collision detection and control mechanism to prevent the simultaneous broadcast from two or more transmitters to the same receiver. A preferred implementation is a fiber optic tap on one leg of the passive star coupler which is connected to an optical receiver of a conventional monitor and control circuit, e.g. one that routes one of the transmissions back to the transmitting processor for retransmission after a preselected time interval.

The WDM can take a variety of forms including filters and grating mechanisms. One form of a grating mechanism is a graduated index of refraction rod lens with a blazed grating. The particular WDM used will depend on the requirement of a given application. A suitable WDDM is simply a WDM operated in reverse.

Stated broadly as a process, the present invention includes producing n separate, but substantially identical optical spectra at each processor and enabling selected ones of the sources associated with one or more addressees. The process includes slicing the spectrum of these n sources into n distinct segments that each define a channel uniquely associated with one source and one address. The process further includes combining the output of all of the sources into a single output signal, demultiplexing the combined signal into the same n spectral portions, directing the n spectral portions to the associated addressee processor, and converting the received optical signal at each processor into an electrical signal. The process includes monitoring the interconnect for collisions and managing the transmissions to avoid simultaneous transmissions to any one processor.

These and other features and objects will be readily understood from the following detailed description which should be read in light of the accompanying drawings.

DETAILED DESCRIPTION OF THE PREFERRED EMBODIMENTS

Figure 3A:
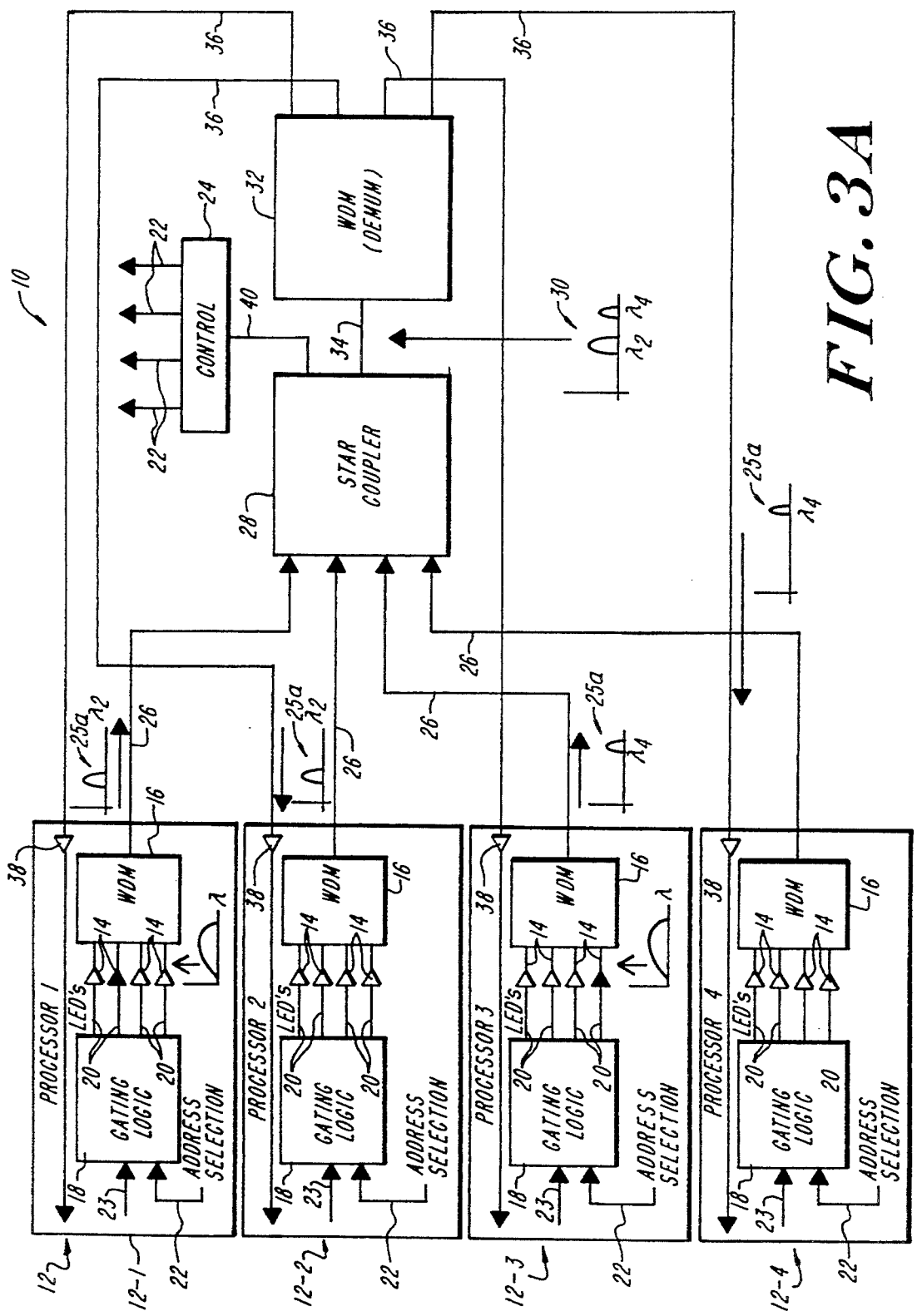
FIG. 3A is a schematic block diagram of a WDMA optical interconnect according to the present invention operating with four channels to fully interconnect four processors and operating in a single addressee mode.
Figure 3B:
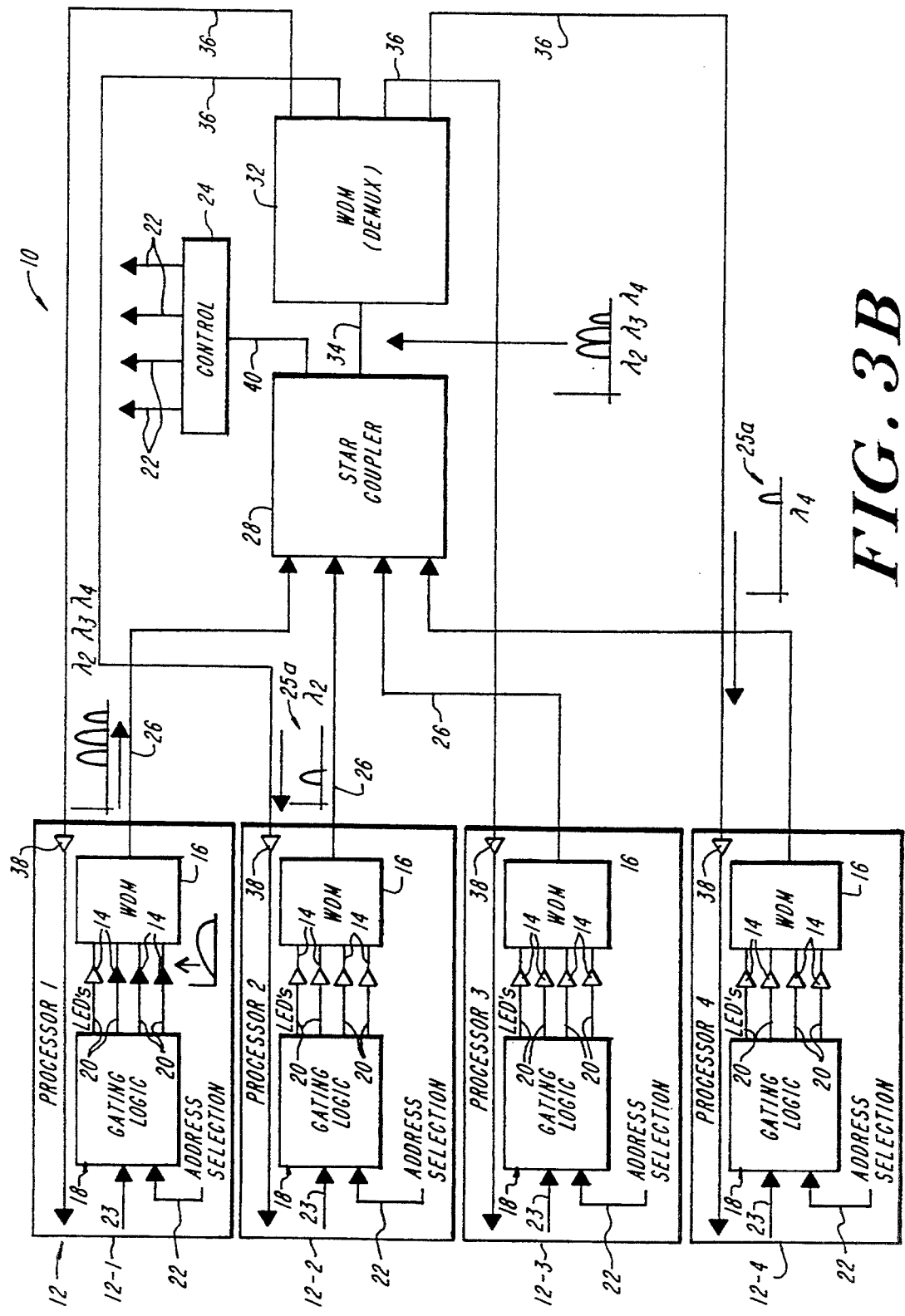
FIG. 3B is a schematic block diagram corresponding to FIG. 3A, but with the optical interconnect of the present invention operating in a broadcast mode.

FIGS. 3A and 3B illustrate in block schematic form an optical interconnect 10 according to the present invention. It uses spectral slicing in a WDMA, fixed wavelength receiver—variable wavelength source architecture to provide a low cost, high performance apparatus and method for making multiple, simultaneous and reconfigurable interconnects. While it can be used to interconnect n processors 12 via n optical channels, for convenience of exposition a four channel system is shown interconnecting four processors 12-1, 12-2, 12-3, and 12-4. In general the number of processors interconnected depends on a given application, with the available bandwidth and the desired data transmission rate being principal design considerations. FIGS. 6–9 relate to an eight channel implementation. It uses the same basic features as the four channel embodiments of FIGS. 3A, 3B and 4.

With reference to FIG. 3A, four processors 12-1 . . . 12-4 are shown linked to one another with a simplex link established between processors 12-1 and 12-2 and between processors 12-3 and 12-4. Each processor 12-1 . . . 12-4 has associated with it four identical light sources 14 that each produce a substantially identical spectrum 25. Preferably the light sources are each one or several light emitting diodes (LED's) that in the preferred embodiment produce a maximum coupled optical power of about −12 dBm over about a 100 nm bandwidth in the IR spectrum. The LED's manufactured and sold by Hewlett Packard under the trade designation HP 1414 are suitable for a four channel interconnect.

Figure 1A:
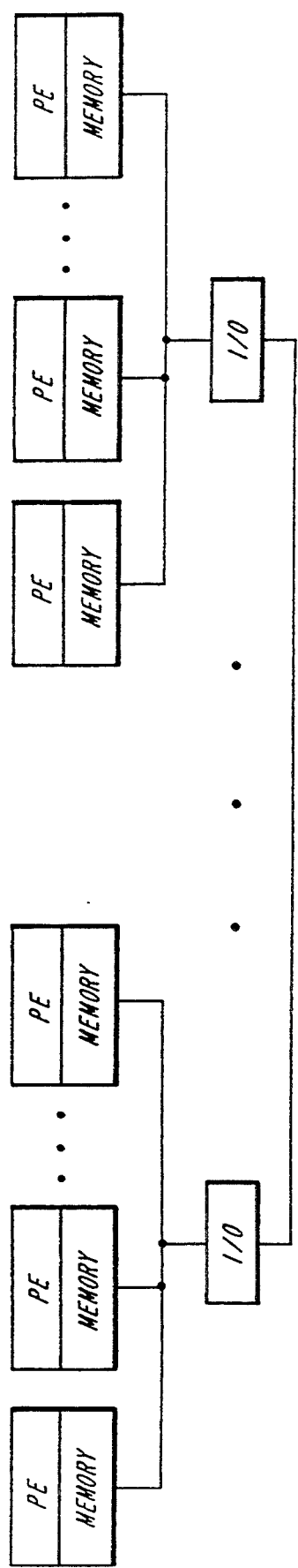
FIGS. 1A–1D are schematic illustrations of prior art hierarchical bus, ring, mesh and hypercube architectures, respectively, used to interconnect multiple processing elements.
Figure 1C:
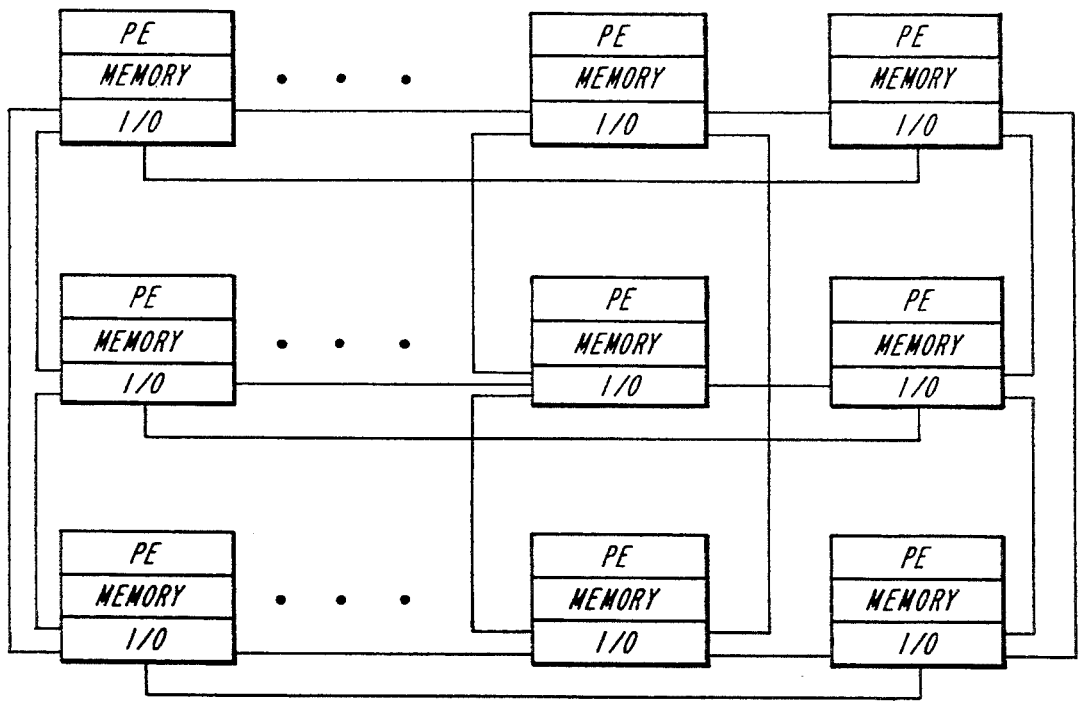
Figure 1B:
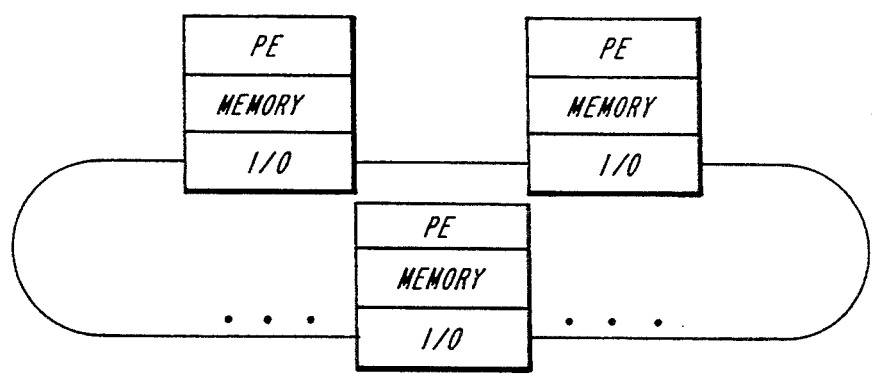
Figure 1D:
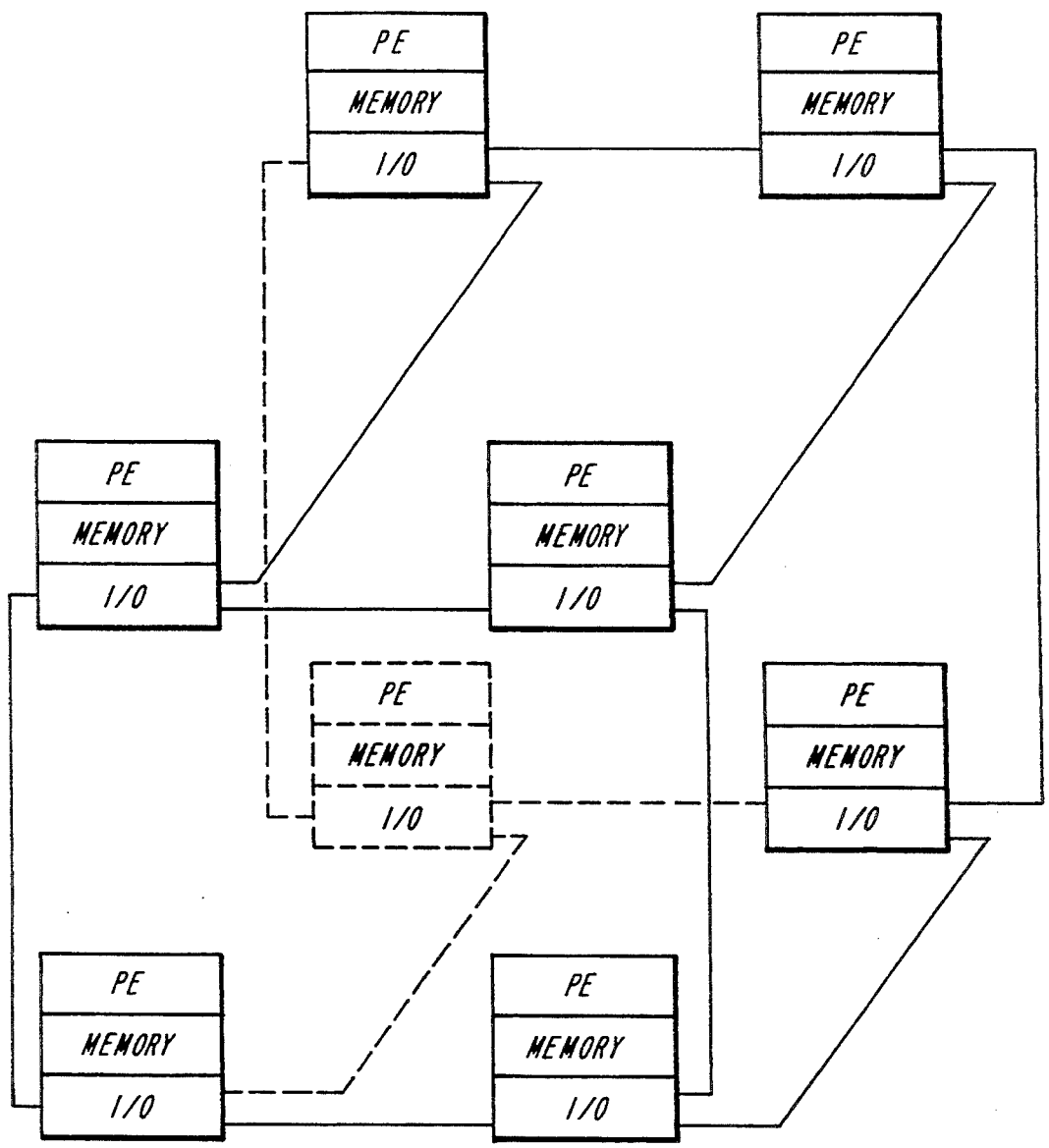
Figure 2:
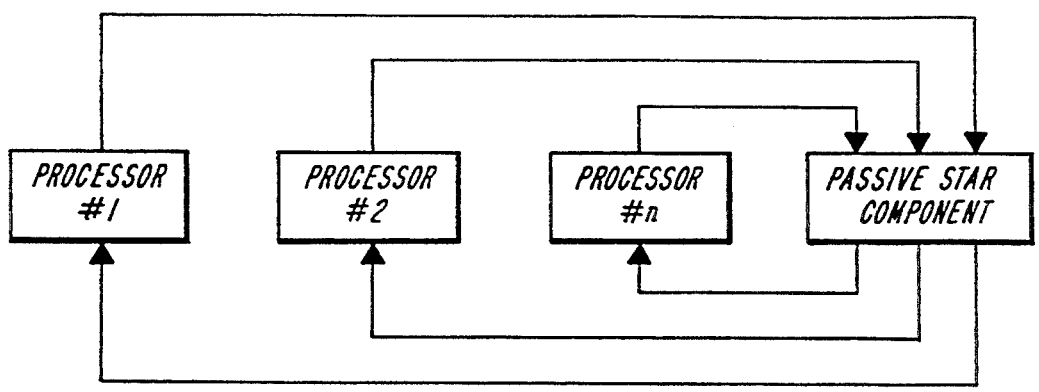
FIG. 2 is a schematic diagram of the general topology of a prior art WDMA network.
Figure 12:
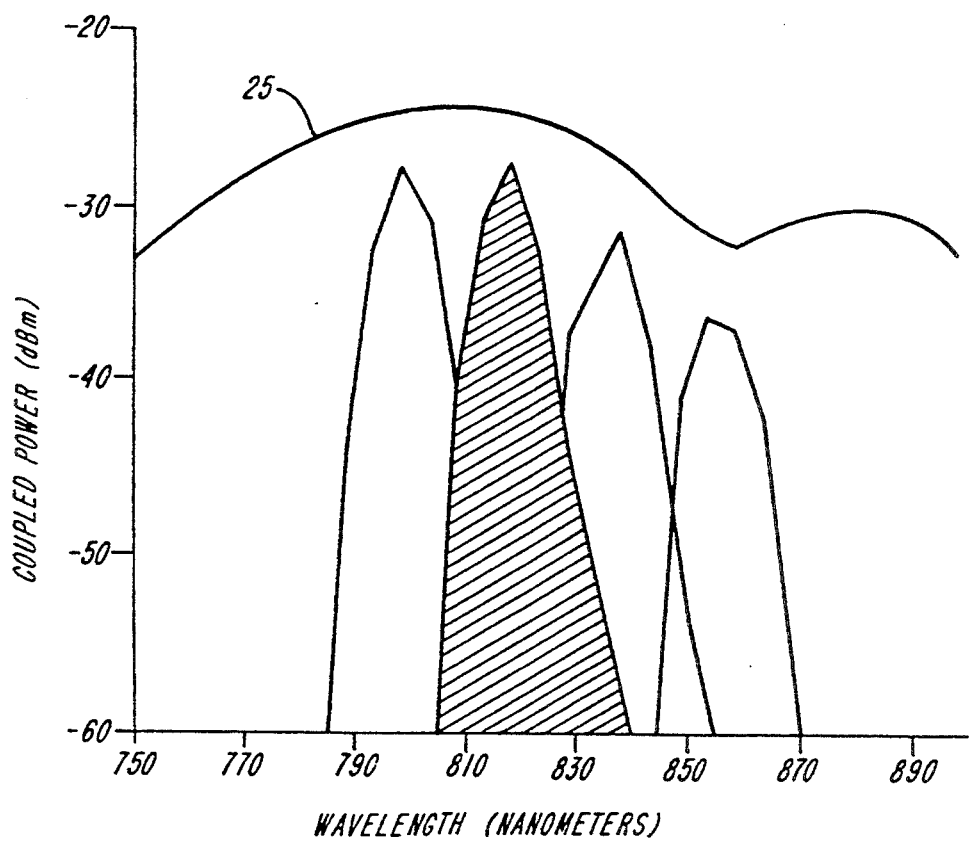
FIG. 12 is a graph showing an output spectrum sliced into four channels and where channel two, centered on a $\lambda$ of 814 nanometers, is selected.
Figure 10:
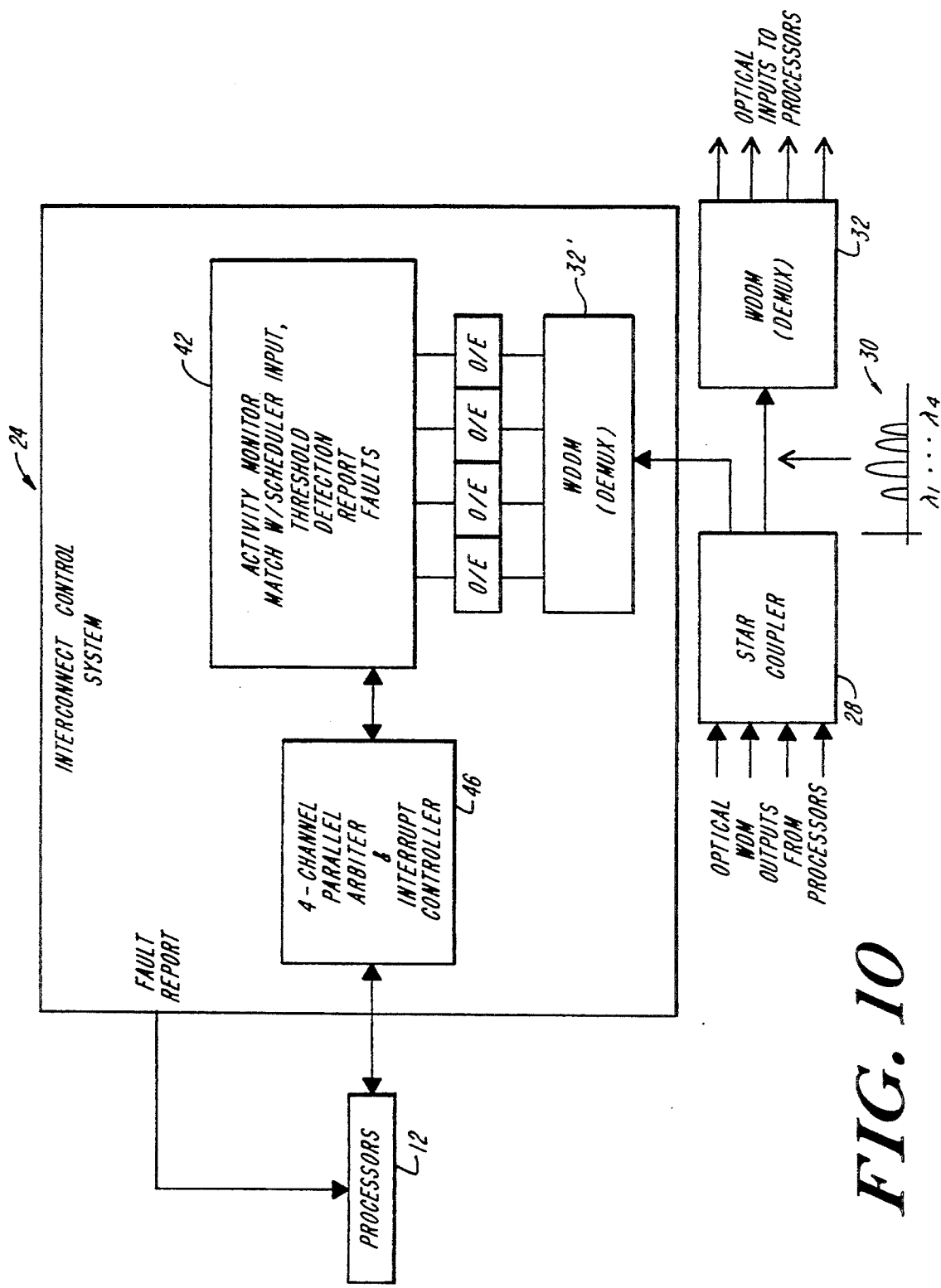
FIG. 10 is a block schematic diagram corresponding to FIG. 9 of an alternate, distributed control system.

The light output of each source 14 is directed to a wavelength division multiplexing device (WDM) 16. The WDM can be any of a variety of such devices such as conventional optical filtering devices and grating devices. One known grating device is a Littrow device employing a graduated index of refraction (grin) rod lens/blazed grating as shown in FIG. 10. Grin lens are ordinarily sensitive to high energy particles and they are temperature sensitive. However, lens of this type available from Gradient Lens Corporation of Rochester, N.Y. are less temperature sensitive and preferred. Gating logic 18, such as a network of conventional AND gates, applies the power of a driver for the LED's input over line 20 to one or more addressed sources 14. An address selection signal applied over line 22 from a controller 24 determines which source or sources is enabled. An input signal to each processor is applied over line 23. As each source 14 is enabled, the filtering characteristics of the WDM device produces a characteristic segment or "slice" of that LED source's spectrum 25 as shown in FIG. 12. The slices 25a are designated as $\lambda_2$ or $\lambda_4$ in FIGS. 3A and 3B, depending on whether processor two or four is the addressee processor. ($\lambda_n$ thus does not refer to a specific wavelength, but to a spectral slice n, although $\lambda_n$ can have an actual wavelength value, e.g. the center wavelength of the associated slice.) All sliced spectra segments 25a produced at a WDM appears as a combined output optical signal on optical fiber 26.

Each output fiber 26 from the four processors 12-1 . . . 12-4 are connected to a 4×2 passive star coupler 28. The star 28 acts as a concentrator, combining the optical output energy from each processor onto a single output fiber 30. When processor 12-1 is transmitting to 12-2 and processor 12-3 is transmitting to 12-4, as shown, the output spectrum of the coupler 28 contains two distinct spectral segments, $\lambda_2$ and $\lambda_4$, of the LED spectrum.

A wavelength division demultiplexer (WDDM) 32 receives the combined optical output of the star 28 via fiber 34. The WDDM is a WDM device operated in the reverse direction. It separates the composite optical spectrum into its constituent wavelength segments. The WDDM has four output ports corresponding to the four spectral portions $\lambda_1 . . . \lambda_4$ and the four channels defined by these spectral slices. An optical fiber 36 connects each output port of the WDDM to an associated optical receiver 38, e.g. an avalanche diode photodetector (ADP), associated with the input interface of each processor.

By way of example, if the source 14 associated with the fourth channel ($\lambda_4$) is enabled at the processor 12-3, then this processor's interface will be connected to the optical receiver 38 at the processor 12-4. If the second LED source 14 of the first processor 12-1 is enabled, then this processor's interface will be connected to the optical receiver 38 at the processor 12-2. These connections can be simultaneous. The links shown in FIG. 3 can also be reconfigured. A change in the address signal at the processor 2-1 from "2" to "3" will enable the "third" LED source (the third from the top as shown) at processor 12-1 to be connected from its interface to the optical receiver 38 at the processor 2-3. Up to four simultaneous processor-to-processor transfers can be maintained at any one time. In addition, this interconnect can be operated in a multicast mode. As shown in FIG. 3B where the second, third, and fourth sources 14 of the processor 12-1 are all enabled simultaneously, the information transmitted from the first processor will appear simultaneously at the optical receivers 38 associated with the processors 12-2, 12-3 and 12-4. This multicast option is particularly useful in downloading software between processors at system initiation.

The controller 24 monitors optical activity in the interconnect via a fiber 40 connected between the passive star coupler 28 and the controller 24. As shown in greater detail in FIG. 9, the controller includes a WDDM 32' which separates the composite spectrum due to broadcasts over four channels into the constituent spectral portions corresponding to each of the channels. The signal on each channel is converted at an optical electrical interface (O/E) by means of an optical receiver into a digital electrical signal that is applied to a conventional activity monitor. The activity monitor also 1) reports faults in the system to a system scheduler 44 which controls the processors 12 and 2) is in interactive communication with the processors via a four channel parallel arbiter and interrupt controller 46, also of conventional design. This control arrangement monitors the levels and detects the presence or absence of optical energy of each slice of the spectrum (channel) and compares the optical energy present to the expected threshold values. The controller receives information detailing the current status and next state of each wavelength from the processor system scheduler 44. If the monitored status does not match the current status, the controller monitor 42 flags the scheduler that a fault has occurred in the system. The monitor threshold is also able to compare optical thresholds to detect an error when more than one processor transmits on the same wavelength.

Figure 4:
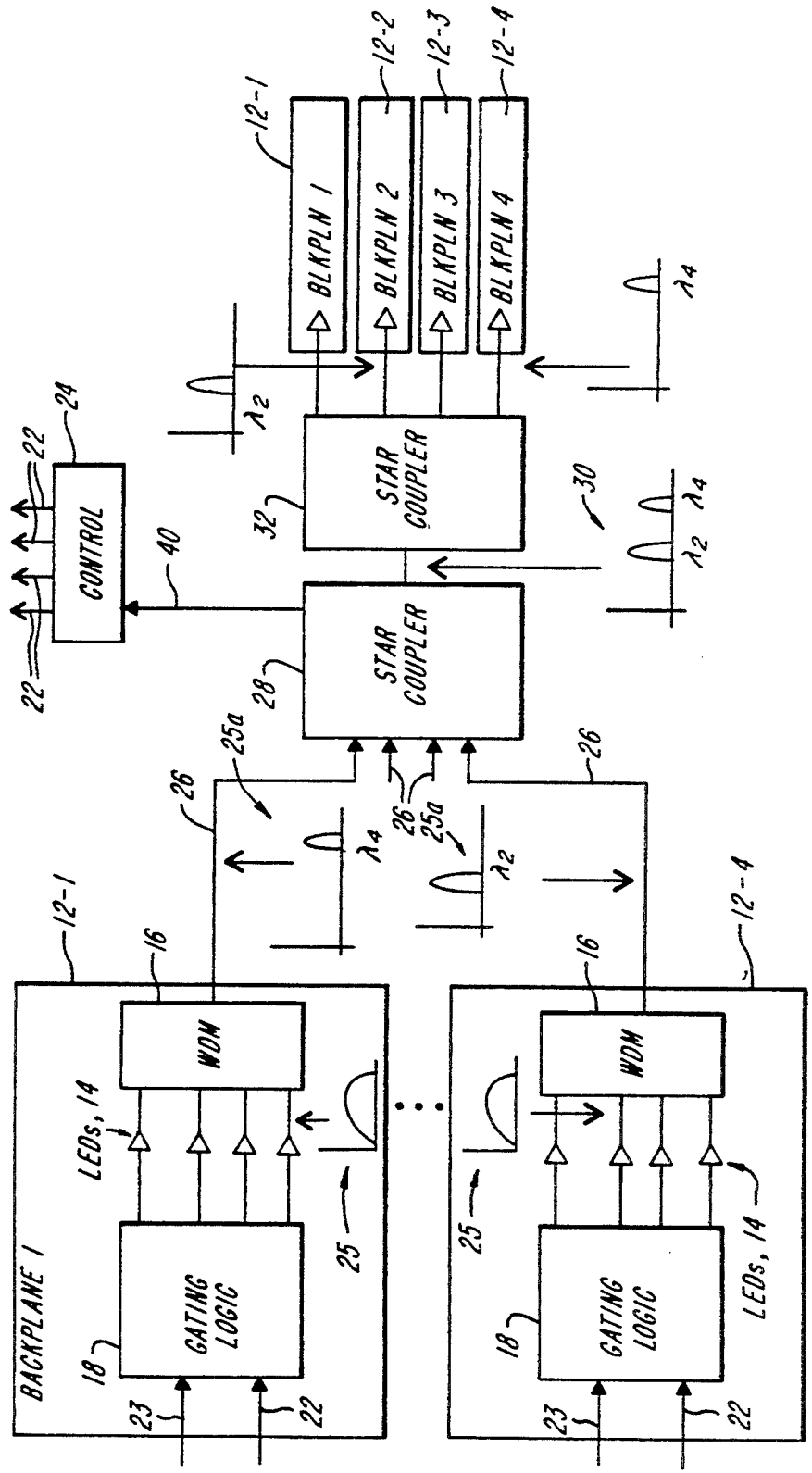
FIG. 4 is a schematic diagram of a WDMA optical interconnect according to the present invention corresponding to FIGS. 3A and 3B and adapted to interconnect four computer backplanes via four optical channels formed by spectral slicing.

FIG. 4 shows in block schematic diagramatic form similar to FIGS. 3A and 3B spectrum slicing in a wavelength division architecture for connecting multiple backplanes, in this case four backplanes connected over four channels each corresponding to a spectral portion or slice 25a. As shown in FIG. 4, backplane 1 is transmitting over a spectral portion designated $\lambda_4$ to communicate with backplane 4 and backplane 4 is transmitting over a spectral portion $\lambda_2$ to communicate with backplane 2. (The function and operation of the like numbered components in the figures is the same.) Note that while FIG. 4 shows four channels communicating between four different backplanes, it is possible to use the hardware and process of the present invention to replace the existing interconnect hardware of a single backplane, as well as interconnecting more than, or fewer than, four backplanes.

Figure 5:
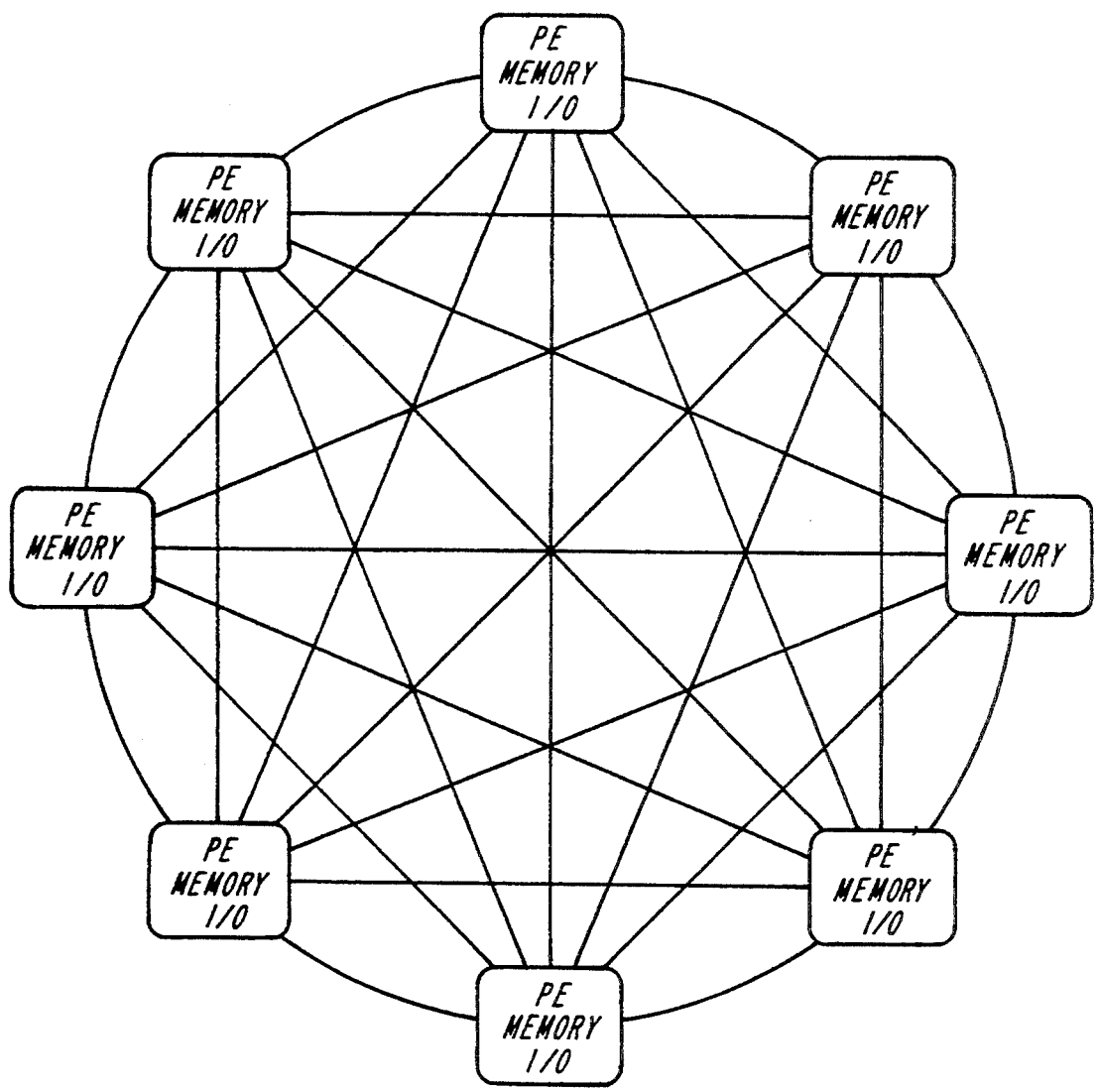
FIG. 5 is a schematic diagram of a completely connected interconnect architecture for eight processors utilizing the spectral sliced WDMA interconnect of the present invention.

FIGS. 5-8 illustrate an extension of the spectral slicing, wavelength division architecture of the present invention to an eight channel embodiment connecting eight processors (including processors with distributed control e.g. multiple processors at eight buses). Each processor or node includes processor equipment (PE), memory, and an input/output interface (IO). FIG. 5 shows a completely connected network architecture where any processor can communicate directly with any other processor, and does not have to transmit through other processors. This fully interconnected architecture avoids retransmission delay problems of the prior art leading to increased latency. This is in large part due to the fact that spectral slicing architecture is non-blocking. It is also significant that the spectral slicing wavelength division architecture of the present invention is protocol independent and able to be reconfigured to support various routing protocols, such as store-and-forward and wormhole routing. The architecture illustrated allows high speed data transmission without problems such as ground loops, electromagnetic interference, and transmission line effects.

Figure 6:
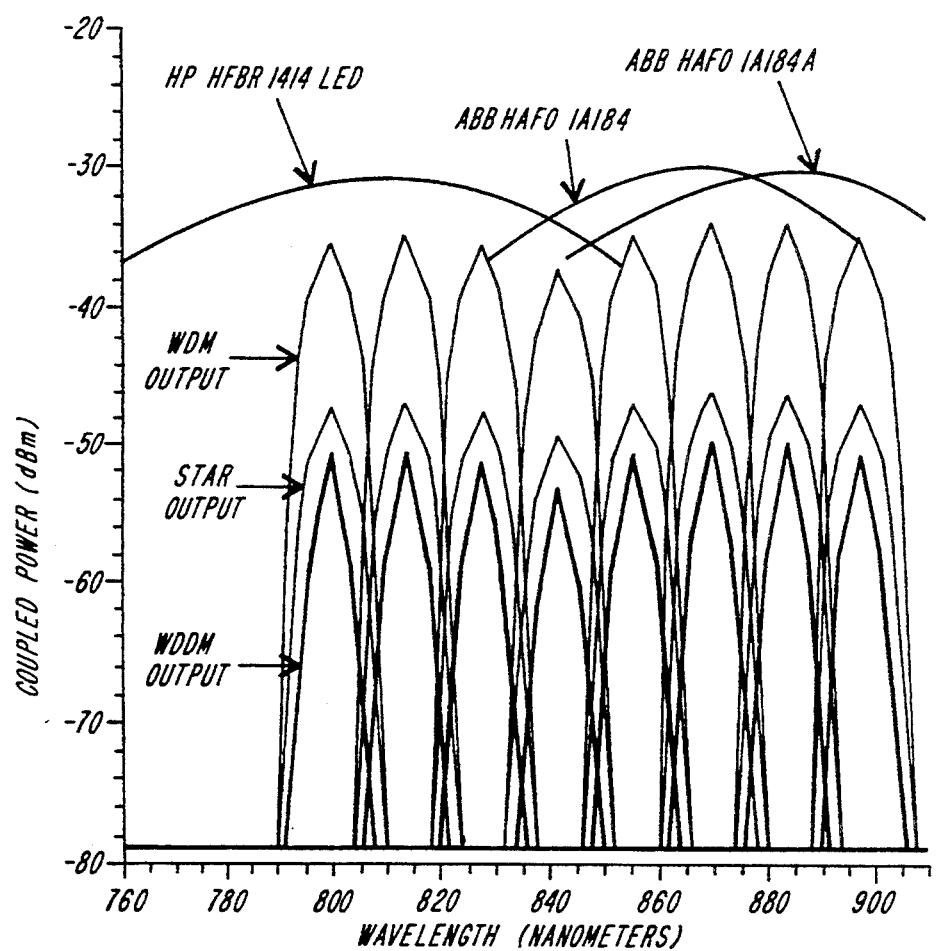
FIG. 6 is a graph showing modeled coupled optical power in an eight channel optical interconnect if constructed and operated in accordance with the present invention, the optical power being shown as a function of wavelength where the optical output is formed by a set of three LED's with different spectra.

FIG. 6 shows the average coupled power at the various stages in the spectral slice wavelength division for a computer modelled eight channel system. The results are based on a WDM that is a Littrow device employing a grin rod lens, blazed grating with 1800 grooves per mm. The device was designed for filter channels with Full Width Half Maximum (FWHM) values of six nanometers located on 14 nanometer centers at 800, 814, 828, 842, 856, 870, 884, and 898 nanometers. The devices match the composite spectrum obtained when using three types of LED components; an HP 1414, an ABB/HAFO 1A184, and an ABB/HAFO 1A184A. The simulation assumes that the average coupled power at the LEDs is $-12.5$ dBm. Cable losses of 1.5 dB and star coupler losses of 10.5 dB with 1.5 dB excess loss are also assumed. This model predicted a worse case slicing loss of 14.3 dB at the WDM and an insertion loss of 5.4 dB at the WDDM. The worst case channel performance is found in channel four where a receiver with $-44$ dBm sensitivity is required. This level of sensitivity can be met by a avalanche photodetector receiver which yields a $10^{-9}$ bit error rate (BER) at a minimum sensitivity of $-46$ dBm at 500 Mbs. This choice of LEDs for a light source for this eight channel configuration and the 500 Mbps throughput therefore leaves a margin of error of 2 dB after accounting for all losses.

Figure 7:
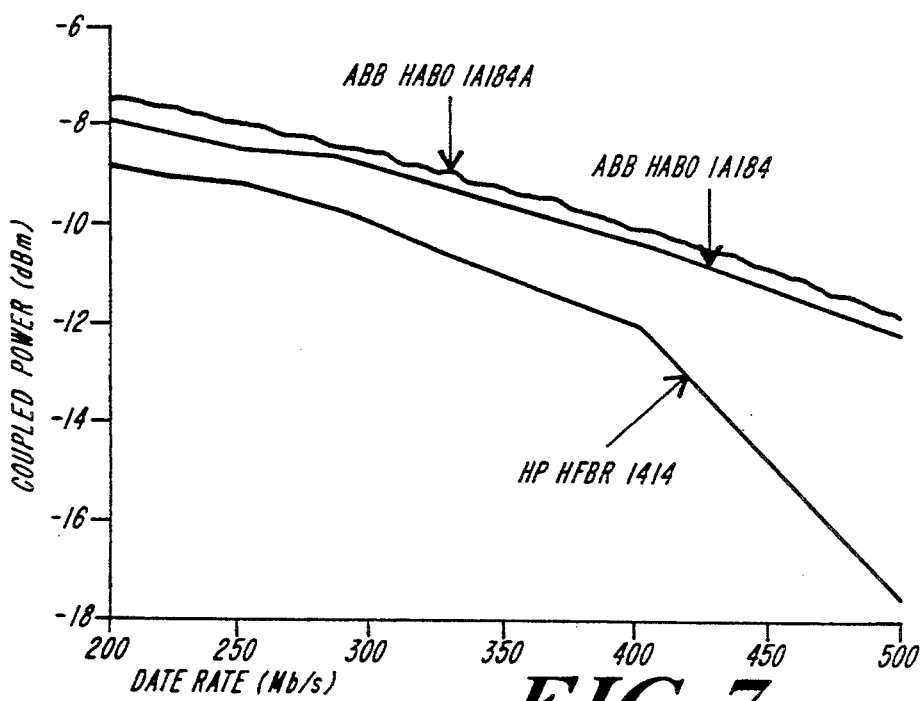
FIG. 7 is a graph of the coupled optical power of the three LED's of FIG. 6 as a function of the data rate.
Figure 8:
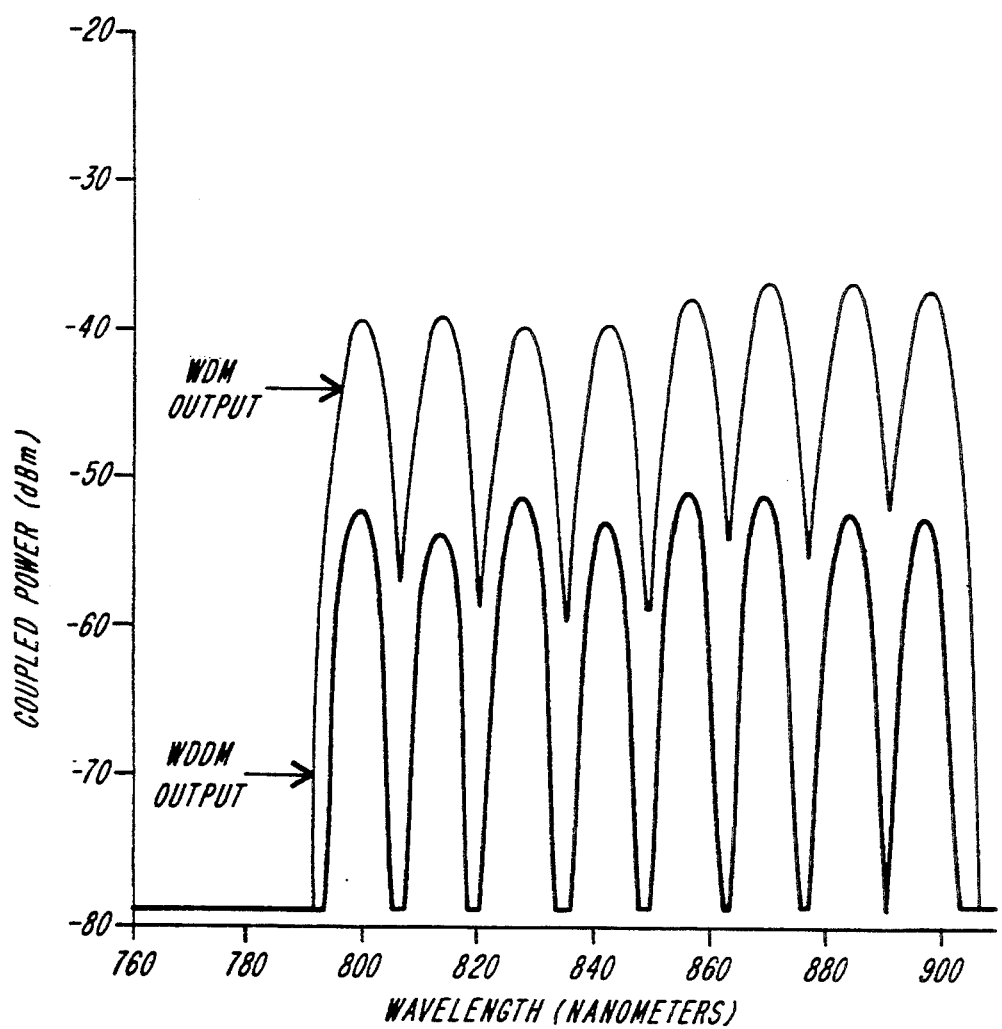
FIG. 8 is a graph of the measured coupled optical power in an eight channel interconnect of type modeled in FIG. 6.
Figure 9:
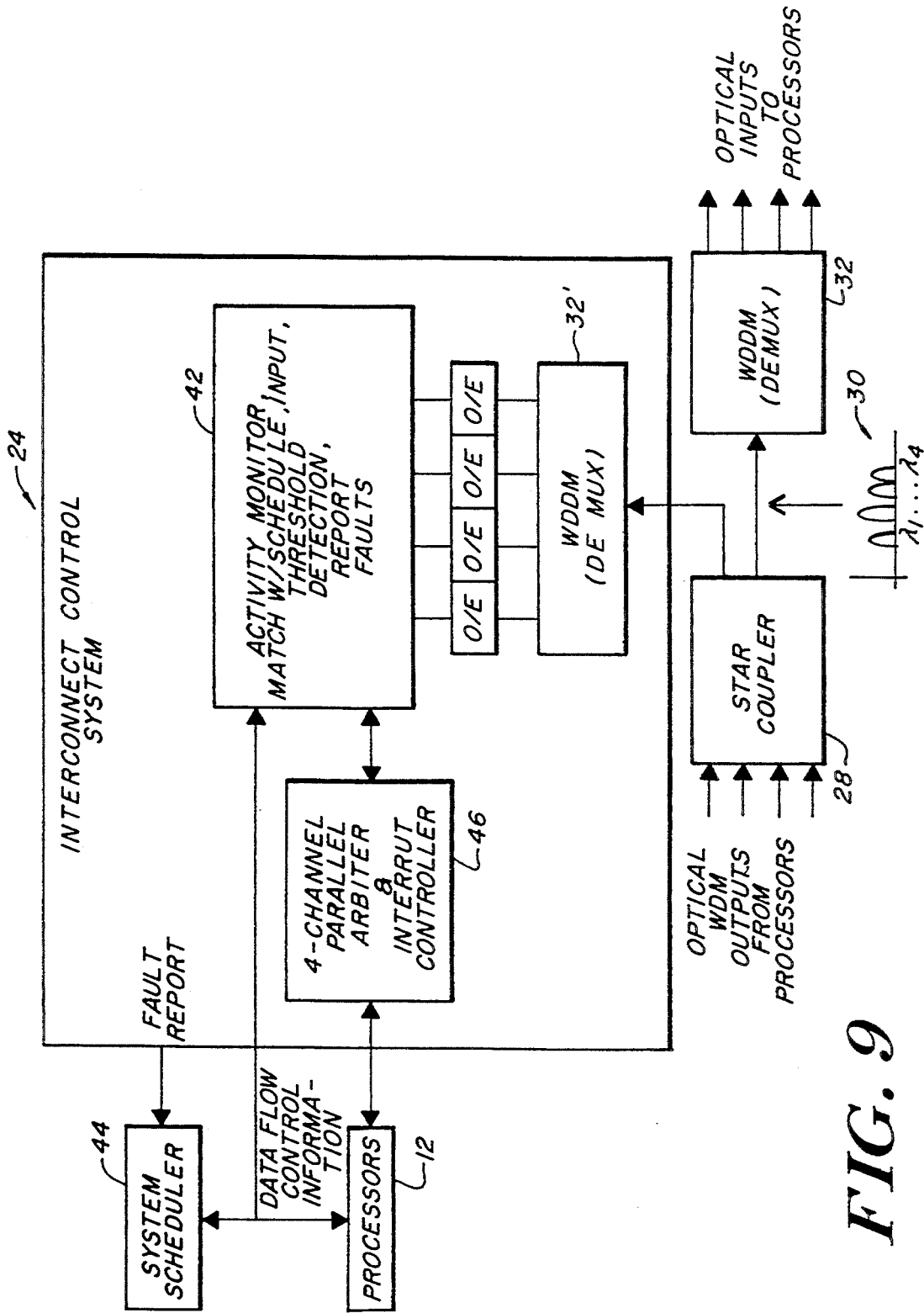
FIG. 9 is a schematic block diagram of a central control system for a four channel optical interconnect of the type shown in FIGS. 3A, 3B and 4.

In actually implementing the system, one concern is loss of coupled optical output power as the modulation rate is increased. The LEDs were driven with a high speed BiCMOS TTL driver with a standard single-pole lead compensation preemphasis filter. A driver of this type drove both the 1A 184 and 1A 184A at 500 Mbps, and the HP 1414 at 400 Mbps. The measured coupled power (dBm) as a function of data rate using these drivers for these three LEDs is shown in FIG. 7. Assuming a worst case modulation rate of 400 Mbps, the effective throughput of this eight channel system is 3.2 Gbps. The predicted average transmitted power for each channel ranges from $-42$ dBm to $-44$ dBm, whereas the average power as actually measured for each channel of the system in a prototype range from $-40.7$ to $-44.9$ dBm. The actual power assignments are shown in FIG. 8. The measured coupled power thus agrees closely with the predicted coupled power.

Looking at cross talk, the simulation anticipated a worst case cross talk in channel 7 due to signals in channel 8. The measured cross talk confirms this prediction. The worst case channel cross talk was 25.9 decibel below the signal level in channel 8. This is well within the design goal of 10 dB (optical) below the signal level. Additional channels could therefore be utilized in the LED spectrum provided by this combination of three LEDs.

FIG. 10 shows a control architecture with a distributed control system 24'. In this system one processor is provided access (the master) to a bus until another processor requires use of the bus. Typically the system uses a set of distributed arbitration lines which are common to every processor. Each processor implements a time out function for the bus control; processors with higher priorities may usurp bus control prior to the time out. Distributed control of the 4-channel interconnect network may be implemented by including a 4-deep parallel master function. This requires that four lines be common to each processor or that a coded master control function be used. The monitor function illustrated in FIG. 9 can be carried over to a distributed control system. In this case each processor requires a communication pathway to the monitor function. Since distributed architectures are generally asynchronous in nature, they are all matched to fiber optic transmission/clock recovery operation.

The LED spectral slice interconnect network of the present invention can be implemented to connect circuit cards that interface several processors operating at a local bus or other processors operated at different circuit cards. Typical backplanes (VME, S-bus) are capable of operating in the 320 Mbps, or 40 Megabytes per second (MBps), range. However, since the output bandwidth requirement is more often a function of a time share nature of the bus and requirement to keep the bus in a non-blocking state, the processors input/output requirements can be relaxed by taking advantage of the non-blocking nature of the present invention. With each LED operating at 400 Mbps one can produce a 3.2 Gbs throughout a processor system. One wavelength is assigned to each processor. The effective throughout of this eight channel system is in order of magnitude improvement over the 320 Mbps VME or S-bus throughput.

Once integrated into a computer backplane environment, the optical network of the present invention appears as multiple parallel backplanes. Control is provided by a central controller with either a VME or an S-bus with master/slave bus request/grant control structure. The control system is modified to support eight independent arbiter/controllers to ensure that only one processor transmits data on a particular wavelength at any one time. The eight parallel arbiter/controller can be implemented using an electrical approach.

Figure 11:
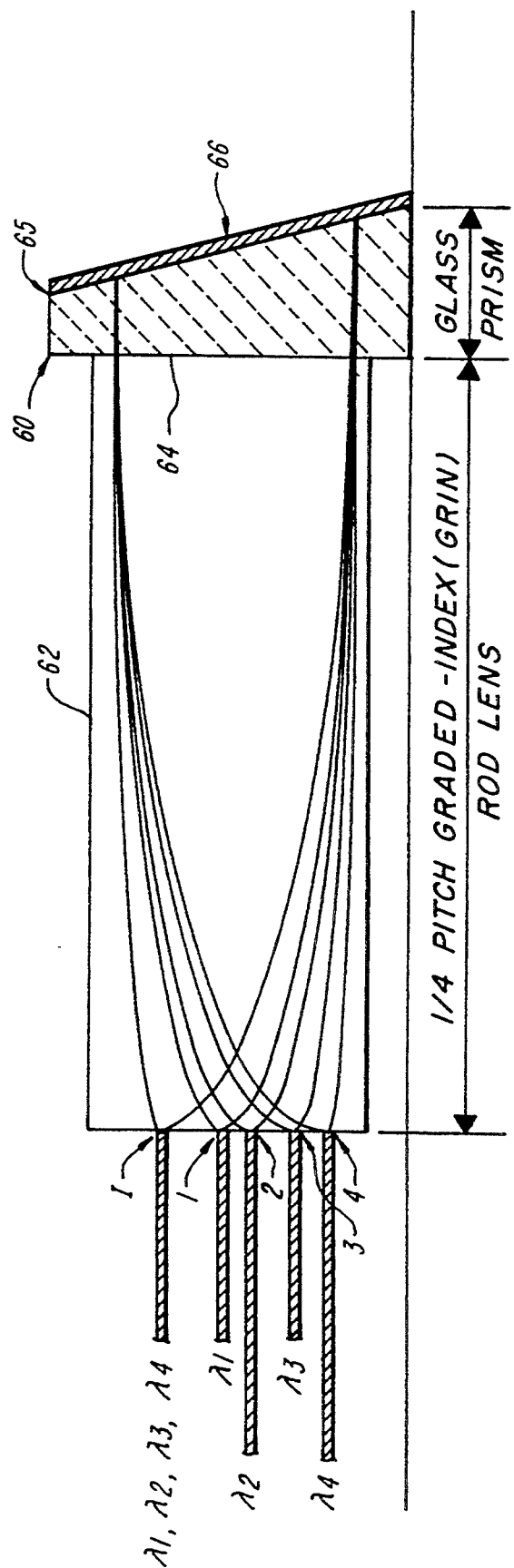
FIG. 11 is a schematic view in side elevation of a grin rod lens, blazed grating WDM/WDDM.

FIG. 11 shows a WDM or WDDM 16 or 32 of the grin-rod lens, blazed grating type. A glass prism 60 is optically coupled to a ¼ pitch graded index rod lens 62 at a flat interface 64. A blazed reflective diffraction grating 66 is formed on the opposite, inclined surface 65 of the prism 60. As shown, a beam of light with a spectrum 25 incident on the device at a point I will be broken out into its constituent wavelengths which are physically separated at points 1, 2, 3 and 4 corresponding to maxima in the diffraction pattern of the corresponding spectral slices centered on $\lambda_1$, $\lambda_2$, $\lambda_3$ and $\lambda_4$.

There has been described a high speed fiber optic interconnect that is non-blocking, has a low latency, is reconfigurable, is able to operate in an address specific or broadcast mode, and is able to operate at a transmission rate heretofore unattainable. Since it is optical, this interconnect is highly immune to electromagnetic interference or electrical transmission effects. Despite power losses due to dispersion which are particularly troublesome for incoherent light sources such as LED's, the present invention can achieve all of these advantages using only standard LED light sources and other known components. The system avoids the cost of $n^2$ high-cost laser light sources, or scanning receivers, or scanning filters, as well as the delays introduced by any system that relies on scanning to make an interconnect. This invention also exhibits sufficiently low cross talk between channels that interconnect with eight or more channels can be used. The interconnect of the present invention is also capable of operating with any protocol.

While this invention has been described with respect to its preferred embodiments, various modifications and alterations will occur to those skilled in the art. For example, while the invention has been described with respect to LED light sources, it is possible to use other sources that produce a spectrum. Also while the multiplexing/demultiplexing is described as carried out by a grin rod lens/blazed grating device, other spectral slicing devices are known and can be used. Even simple filtering is possible, but increased power losses can be expected. Other control architectures will also be evident to those skilled in the art. These and other variations and modifications are intended to fall within the scope of the appended claims.

What is claimed is:

1. An n channel optical interconnect for the output signals of n processors, the interconnect providing multiple simultaneous and reconfigurable connections among the processors, comprises
    n sources of optical energy associated with each of said processors,
    the spectrum of each of said sources being substantially the same,
    an optical receiver associated with each of said n processors,
    a wavelength division multiplexer (WDM) associated with each of said n processors that receives the optical output of each of the n sources associated with a given processor, and transmits the optical energy from said n sources associated via an optical output with a portion of said spectrum being uniquely associated with and thereby addressing a preselected one of said n processors,
    means for coupling the output of all of said WDM's into a single optical output,
    a wavelength division demultiplexer (WDDM) having an input and n optical outputs, said input receiving the output of said coupling means and demultiplexes it into n spectral portions each directed to an associated one of said n optical outputs,
    means for transmitting each of said n optical outputs of said WDDM to said receiver of the associated one of said n processors,
    means for controlling the application of an output signal from a given processor to its associated sources thereby to select the address for the transmission of said output signal to at least one other processor.

2. The optical interconnect of claim 1 further comprising collision detection and management means.

3. The optical interconnect of claim 1 wherein said optical energy sources each comprise at least one light emitting diode (LED).

4. The optical interconnect of claim 3 wherein LED emits a spectrum with a bandwidth of at least 30 m and can operate at a data rate of at least 200 Mbs.

5. The optical interconnect of claim 1 wherein said WDM is each a grating device.

6. The optical interconnect of claim 5 wherein said grating device is a graduated refractive index (GRIN) rod lens with a blazed grating.

7. The optical interconnect of claim 5 wherein said WDDM is a WDM operated in reverse.

8. The optical interconnect of claim 1 wherein electronic control means comprises digital gating logic that receives an address selection signal which applies said output signal of the associated one of said processors to the source or sources associated with the processor or processors to which the signal is to be sent.

9. A process for optically interconnecting n processors to transmit an output signal from one or more processors simultaneously and reconfigurably, comprising
    providing n sources of optical energy associated with each processor, that each produce a generally identical output spectrum,
    uniquely associating each of said n sources with one of said processors as an addressee and with a portion of said spectrum by multiplexing the outputs of said n optical sources,
    coupling the multiplexed output of all of said sources into a single optical output signal, demultiplexing said single optical output signal into said spectrum portions, transmitting any output signal in each of said portions to the associated processor, and converting said optical signal portion into an electrical input signal at the associated addressee processor.

10. The optical interconnect process of claim 9 wherein said uniquely associating includes electronically gating the output signal to at least one of said sources under the control of an address selection signal produced by the processor that transmits said output signal.

11. The optical interconnect process of claim 9 further comprising the steps of detecting collisions of transmissions from plural processors to the same processor at the same time and controlling the data transmission to avoid the collision.

* * * * *